(12) United States Patent
Kim et al.

(10) Patent No.: US 8,838,580 B2
(45) Date of Patent: Sep. 16, 2014

(54) METHOD AND SYSTEM FOR PROVIDING KEYWORD RANKING USING COMMON AFFIX

(75) Inventors: DongWook Kim, Seongnam-si (KR); Youn Sik Lee, Seoul (KR); Jiyeon Lee, Seoul (KR)

(73) Assignee: NHN Corporation, Kyunggi-Do (KR)

( * ) Notice: Subject to any disclaimer, the term of this patent is extended or adjusted under 35 U.S.C. 154(b) by 651 days.

(21) Appl. No.: 12/600,421

(22) PCT Filed: Apr. 29, 2008

(86) PCT No.: PCT/KR2008/002420
§ 371 (c)(1),
(2), (4) Date: Nov. 16, 2009

(87) PCT Pub. No.: WO2008/143407
PCT Pub. Date: Nov. 27, 2008

(65) Prior Publication Data
US 2010/0161618 A1    Jun. 24, 2010

(30) Foreign Application Priority Data

May 18, 2007 (KR) .......... 10-2007-0048829
Apr. 4, 2008 (KR) .......... 10-2008-0031626

(51) Int. Cl.
*G06F 17/30* (2006.01)
(52) U.S. Cl.
USPC ........... 707/719; 707/706; 707/713; 707/714; 707/715; 707/716; 707/717; 707/718; 707/721; 707/736; 707/758; 707/781; 709/219; 704/9; 704/10
(58) Field of Classification Search
USPC ......... 707/706, 713–719, 721, 722, 736, 758, 707/999.005–6; 709/219; 704/9, 10
See application file for complete search history.

(56) References Cited

U.S. PATENT DOCUMENTS

| | | | | |
|---|---|---|---|---|
| 6,078,917 A * | 6/2000 | Paulsen et al. | ......................... | 1/1 |
| 6,430,557 B1 * | 8/2002 | Gaussier et al. | ...................... | 1/1 |
| 6,944,612 B2 * | 9/2005 | Roustant et al. | .............. | 707/706 |
| 7,428,529 B2 * | 9/2008 | Zeng et al. | ........................... | 1/1 |
| 2002/0103809 A1 * | 8/2002 | Starzl et al. | ................... | 707/102 |
| 2004/0093321 A1 * | 5/2004 | Roustant et al. | .................. | 707/3 |
| 2005/0165838 A1 * | 7/2005 | Fontoura et al. | .......... | 707/104.1 |
| 2005/0234879 A1 * | 10/2005 | Zeng et al. | ........................ | 707/3 |
| 2006/0253410 A1 * | 11/2006 | Nayak et al. | ..................... | 707/1 |
| 2007/0288602 A1 * | 12/2007 | Sundaresan | .................. | 709/219 |

FOREIGN PATENT DOCUMENTS

| | | |
|---|---|---|
| EP | 0032194 | 7/1981 |
| EP | 0361464 | 4/1990 |
| JP | 07-056948 | 3/1995 |

OTHER PUBLICATIONS

Lin Guo, Feng Shao, Chavdar Botev, Jayavel Shanmugasundaram, XRANK: Ranked Keyword Search over XML Documents, SIGMOD 2003, Jun. 9-12, 2003, San Diego, CA, Copyright 2003 ACM 1-58113-634-X/03/06.
Budi Yuwono, Dik L. Lee, Search and Ranking Algorithms for Locating Resources on the World Wide Web, IEEE, 1996, pp. 164-171.

* cited by examiner

*Primary Examiner* — Syling Yen
(74) *Attorney, Agent, or Firm* — Harness, Dickey & Pierce, P.L.C.

(57) ABSTRACT

A method and system for providing keyword ranking using a common affix is provided. The method for providing keyword ranking using the common affix includes: extracting a common affix using a keyword set; and providing keyword ranking which includes the extracted common affix.

20 Claims, 6 Drawing Sheets

| RANKING | SUFFIX |
|---|---|
| 1 | MOVING IMAGES |
| 2 | MAKING |
| 3 | PLAY |
| 4 | DOWNLOAD |
| 5 | TYPE |
| 6 | KOREA |
| 7 | MIDDLE SCHOOL |
| 8 | SCHOOL |
| 9 | STYLE |
| 10 | RANKING |

502

(EPISODE+PART+CHAPTER)*RE*(PLAY)

503

| RANKING | KEYWORD | TOTAL QUERY COUNT OF SEARCHING FOR KEYWORDS |
|---|---|---|
| 1 | WHITE TOWER EPISODE 10 REPLAY | 42329 |
| 2 | PRISON BREAK CHAPTER 10 REPLAY | 40112 |
| 3 | PRISON BREAK CHAPTER 9 REPLAY | 35798 |
| 4 | HIGH KICK CHAPTER 71 REPLAY | 33215 |
| 5 | WHITE TOWER EPISODE 11 REPLAY | 30190 |
| 6 | JOOMONG EPISODE 40 REPLAY | 28745 |
| 7 | JOOMONG EPISODE 39 REPLAY | 28124 |
| 8 | HIGH KICK EPISODE 68 REPLAY | 26351 |
| 9 | HWANGJEENY EPISODE 11 REPLAY | 23297 |
| 10 | HARRY PORTER PART 100 REPLAY | 21104 |
| 11 | PRISON BREAK EPISODE 5 REPLAY | 16598 |
| ... | ... | ... |
| 99 | AUTUMN EPISODE 1 REPLAY | 8210 |
| 100 | AZZILSO EPISODE 3 REPLAY | 7934 |

METHOD AND SYSTEM FOR PROVIDING KEYWORD RANKING USING COMMON AFFIX

CROSS-REFERENCE TO RELATED APPLICATIONS

This application is the National Stage of International Application No. PCT/KR2008/002420, filed Apr. 29, 2008, and claims priority from and the benefit of Korean Patent Application No. 10-2007-0048829, filed on May 18, 2007, and Korean Patent Application No. 10-2008-0031626, filed on Apr. 4, 2008, all of which are hereby incorporated by reference for all purposes as if fully set forth herein.

FIELD OF THE INVENTION

The present invention relates to a method and system for providing keyword ranking using a common affix, and more particularly, to a method and system for providing keyword ranking that calculates a ranking of each affix with a common attribute included in a keyword which is inputted in a keyword set, extract a common affix, and establishes a regular expression including the extracted common affix, thereby providing keyword ranking.

DISCUSSION OF THE BACKGROUND

In a conventional art, a query count of searching for keywords being inputted in a keyword set is analyzed to be provided. However, in a current Internet search environment where a large number of various keywords are inputted, there is a need to more systematically analyze keywords and provide keyword statistics.

As is widely known, ranking of all keywords, keyword ranking for a local area, keyword ranking for a specific age, and keyword ranking for a specific time are provided at present, however it requires many efforts and a considerable amount of time to provide keyword ranking with respect to a large number of keywords by exclusively considering a query count of searching for a huge number of keywords without a predetermined criterion. To solve the above described problem, a method for effectively providing keyword ranking is required by analyzing keywords and extracting attributes of the keywords.

In particular, a feedback scheme providing keyword ranking by using configuration elements with a common attribute from among a huge number of inputted keywords is required. In addition to this, there are many proposals on how to provide keyword ranking and using which kind of common attribute.

SUMMARY OF THE INVENTION

The present invention is provided to solve the above described problems of the conventional art, and provides a method and system for providing keyword ranking using a common affix.

The present invention also provides a method and system for providing keyword ranking using a common affix in order to search for an affix which is not retrieved yet, by counting keywords including an affix with a common attribute in a keyword set and by extracting the common affix by determining a ranking of each affix.

The present invention also provides a method and system for providing keyword ranking using a common affix which can calculate keyword ranking containing an attribute of a corresponding affix without limiting keywords, within a specific ranking, by providing keyword ranking including an extracted common affix.

The present invention also provides a method and system for providing keyword ranking using a common affix which can obtain popularity ranking for re-playing moving images of a series type via a regular expression based on an extracted common affix.

According to an exemplary embodiment of the present invention, there is provided a method for providing keyword ranking using common affix including: extracting a common affix using a keyword set; and providing keyword ranking which includes the extracted common affix.

In an exemplary implementation, the extracting of the common affix using the keyword set includes: counting keywords including each of a plurality of affixes with common attribute in the keyword set; and calculating a ranking of each affix using the counting result of the keywords and extracting the common affix.

In an exemplary implementation, the providing of the keyword ranking which includes the extracted common affix includes: establishing a regular expression including an affix which will be a target that provides keyword ranking from among the extracted common affix; and providing the keyword ranking using the total query count of searching for a plurality of keywords which are determined via the regular expression.

According to an exemplary embodiment of the present invention, there is provided a system for providing keyword ranking using common affix including: a common affix extraction unit extracting a common affix using a keyword set; and a keyword ranking providing unit providing keyword ranking which includes the extracted common affix.

In an exemplary implementation, the common affix extraction unit includes: a keyword counter counting keywords including each of a plurality of affixes with a common attribute in a keyword set; and an affix ranking calculation unit calculating a ranking of each affix using the counting result of the keywords and extracting the common affix.

In an exemplary implementation, the keyword ranking providing unit includes: a regular expression establishment unit establishing a regular expression using the extracted common affix; and a keyword ranking determination unit determining the keyword ranking using the total query count of searching for a plurality of keywords which are determined via the regular expression.

According to the present invention, there is provided a method and system for providing keyword ranking using a common affix.

According to the present invention, there is provided a method and system for providing keyword ranking using a common affix in order to search for an affix which is not retrieved yet, by counting keywords including an affix with a common attribute in a keyword set and extracting to the common affix by determining ranking for each affix.

According to the present invention, there is provided a method and system for providing keyword ranking using a common affix which can calculate keyword ranking containing an attribute of a corresponding affix without limiting keywords, within a specific ranking, by providing keyword ranking including an extracted common affix.

According to the present invention, there is provided a method and system for providing keyword ranking using a common affix which can obtain re-broadcasting popularity ranking for re-playing moving images of a series type via a regular expression based on an extracted common affix.

BRIEF DESCRIPTION OF THE DRAWINGS

FIG. 5 is a diagram illustrating operations of providing keyword ranking using an extracted common affix according to an embodiment of the present invention.

DETAILED DESCRIPTION OF THE ILLUSTRATED EMBODIMENTS

Figure 1:
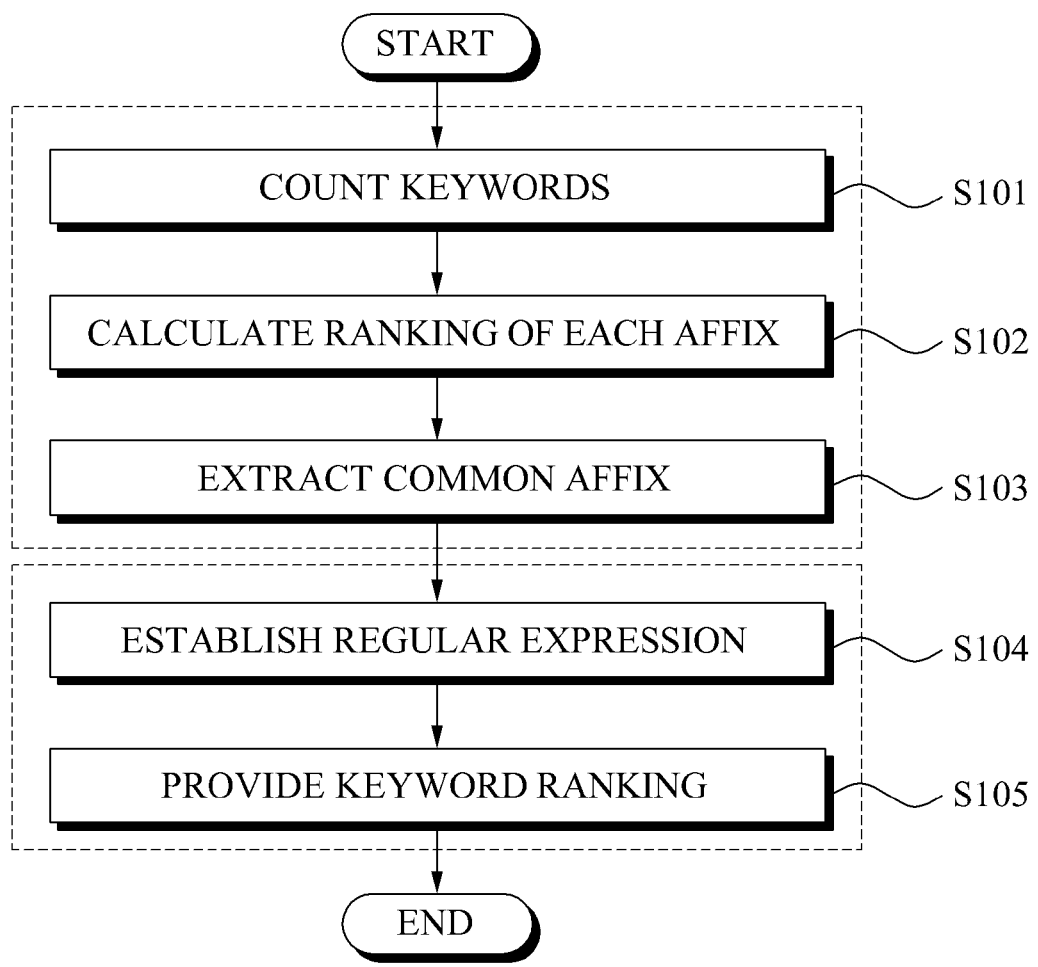
FIG. 1 is a flowchart illustrating a method for providing keyword ranking using a common affix according to an embodiment of the present invention.

Hereinafter, example embodiments of the present invention will be described in detail by referring to accompanying drawings. Although the present invention is described in connection with the embodiment of the present invention, it is not limited thereto. Examples of which are illustrated in the accompanying drawings, wherein like reference numerals refer to the like elements throughout.

A method for providing keyword ranking using a common affix according to an embodiment of the present invention may be implemented by a system for providing keyword ranking using a common affix. The present invention may respectively provide keyword ranking with respect to each of a common prefix and a common suffix.

FIG. 1 is a flowchart illustrating a method for providing keyword ranking using a common affix according to an embodiment of the present invention.

Operations S101 through S103 illustrate operations of extracting a common affix using a keyword set, and operations S104 and S105 illustrate operation of providing keyword ranking which includes an extracted common affix.

Operation S101 illustrates an operation of counting keywords including each of a plurality of affixes with a common attribute in a keyword set. In this instance, the keyword set may indicate a medium including a plurality of keywords. Specifically, the medium including the plurality of keywords may include a server, a database, and a storage device.

As an example, the keyword set may be a search log including a plurality of search words or a set of words associated with at least one single document. In this instance, the search log may be generated by collecting search words inputted by users during a predetermined time period. The keyword set may indicate a set of words included in contents or a title of a single document, such as a news article or a posting in a blog. In an exemplary embodiment of the present invention, the affix may include a prefix and a suffix.

According to an embodiment of the present invention, the keyword set may include keywords which are inputted during a predetermined time period. In this instance, the keyword being inputted during the predetermined time period may be inputted at a predetermined specific daily, weekly, monthly, or yearly time.

According to an embodiment of the present invention, the keyword set may include a number of types of keywords or a total query count of searching for the keywords, the keywords including each of a plurality of affixes with a common attribute in a keyword set. Also, both the number of the type of keywords or the total query count of searching for the keywords may be counted. As an example, when a prefix with a common attribute is "A", a keyword where "A" is combined with a head of the keyword may be included in the type of keywords including the prefix. Conversely, when a suffix with a common attribute is "B", a keyword where "B" is combined with a tail of the keyword may be included in the type of keywords including the suffix.

As an example, when a prefix with a common attribute is "Newly-married", a keyword such as "Newly-married couple" may be included in the type of keywords including the prefix "Newly-married". According to the present invention, a total query count of searching for a keyword including a prefix "Newly-married" may be counted, the keyword being inputted in a keyword set during a predetermined time period.

As an example, when a suffix with a common attribute is "University", a keyword such as "Yonsei University" and "Korea University" may be included in the type of keywords including the suffix "University". According to the present invention, a total number of searching for a keyword including a suffix "University" may be counted, the keyword being inputted in a keyword set during a predetermined time period.

As an example, the common attribute may correspond to an affix with identical number of a character, and may differ depending on a case providing keyword ranking. Specifically, from among keywords in a keyword set, a plurality of keywords which include an affix with two characters may be counted. In this instance, the common affix which is extracted according to the present invention is irrelevant to whether an affix has meaning. Therefore, the extracted common affix may correspond to both an affix with meaning and an affix without meaning.

Also, the common attribute, from among suffixes, may correspond to a suffix which is combined with a tail of a figure, and the figure may indicate a query count of a search target. That is, when keywords include words meaning contents of a series type, the figure may indicate a query count with respect to the contents of a series type. As an example, when a keyword is "CSI Season 3 Episode 1 Replay", that is contents of a series type, a suffix "Episode" may correspond to a suffix being combined with a tail of the figure "1" indicating a query count of broadcasting "CSI Season 3".

According to an embodiment of the present invention, the keyword including the suffix being combined with the tail of the figure is counted, thereby providing ranking of the contents to a request person who wants to repeatedly view the contents of a series type. In this instance, the contents of a series type may include music, movies, books, software programs, and the like.

Operation S102 illustrates calculating ranking of each affix using the counting result of keywords and extracting a common affix.

In operation S102, a ranking of each affix is calculated using the counting result of the keyword, as described above, the counting of the keywords counts a number of types of the keywords including each affix or a total query count of searching for the keywords. In this instance, the ranking of each affix may be calculated in an order of the number of types of the keywords being larger or in an order of total query count of searching for the keywords being larger.

In operation S102, the ranking of each affix may be calculated by applying a weight to each of the number of types of the keywords and the total query count of searching for the keywords. Specifically, regarding a predetermined affix of a plurality of affixes, it is assumed that a number of types of the keywords is 3,000 and a total query count of searching for the keywords 50,000. When each converted score is 30 and 50, and when an established weight is 0.6 for the number of types of the keywords, and an established weight is 0.4 for the total query count of searching for the keywords, 30*0.6+50*0.4=48. Accordingly, a ranking may be calculated with respect to each affix by arranging calculated scores in an order of being larger.

The above described method may be a scaling method to compare counted values in case that a number of ciphers are different or there is a large difference between two values. In this instance, the converted scores may differ according to the number of types of the keywords and the total query count of searching for the keywords. Also, the weight may differ according to establishment of a keyword ranking provider.

According to an embodiment of the present invention, when a ranking of each of the plurality of affixes are calculated, the ranking may be calculated by applying a weight to the counting result based on attribute of each affix. In this instance, as an affix has meaning by itself and as a query count of being used to be a keyword being larger, a weight may be established to be larger.

In operation S103, an affix, within a predetermined ranking for common affix extraction, is extracted to be the common affix, based on the calculated ranking of each of the plurality of affixes. As an example, when a ranking of each plurality of affixes is calculated from $1^{st}$ to $100^{th}$, and when common affix extraction ranking are established from $1^{st}$ to $10^{th}$, an affix, within the predetermined ranking for common affix extraction, may be extracted to be a common affix.

As an another example, a common affix may be extracted in case that the number of types of the keywords and the total query count of searching for the keywords are equal to or greater than a predetermined reference value.

In operation S104, a regular expression is established using the extracted common affix. As an example, in operation S104, the regular expression may be established using the extracted common affix alone, or may be established by combining the extracted common affix with another word.

As an example, keyword ranking is provided with respect to "Busan" with a common attribute of two characters, a regular expression may be established as [Busan*Trip]. That is, according to the present invention, the regular expression may be established using the extracted common affix alone, or may be established by combining the extracted common affix with another word.

In this instance, the regular expression may be a search query which is generated using a common affix via search combination symbols such as arithmetic symbols. That is, according to the present invention, the regular expression is generated associated with the common affix using the extracted common affix, and re-search is performed using the generated regular expression, thereby providing keyword ranking based on the re-search result. Generally, from among the search combination symbols used in the regular expression, "+" may be defined as meaning of "or", and "*" may be defined as meaning of "and".

When a regular expression is established as the above, keywords to be searched via the established regular expression may be "Map for Busan trip", "Gourmet Restaurant for Busan trip", "Recommended Places for Busan trip", "Schedules for Busan trip", and the like.

In operation S105, keyword ranking is provided using a total query count of searching for each of a plurality of keywords being determined via the regular expression.

That is, keyword ranking may be provided by counting the total query count of searching of each of the plurality of keywords, the plurality of keywords being obtained using the search result being obtained from operation S104. Referring back to the example in operation S104, as a result of comparing the total query count of searching each of the keywords, keywords including "Busan" are arranged based on the total query, thereby providing keyword ranking.

When a regular expression is used, a ranking in a different type may be obtained. As an example, when an extracted common prefix is "Major", the regular expression may be established as [Major*League]. Search results associated with "Major League" may be induced. That is, search results such as "Popular Player in Major League", "Replay Games Major League", "Ranking Forecast Major League", "Character Items Sales of Major League", and the like are induced.

In this instance, when the induced search results are arranged according to a number of a query count, a popular keyword may be extracted from keywords associated with "Major League".

Hereinafter, detailed embodiments of providing keyword ranking using a common affix will be described by referring to FIGS. 2 through 4 using the above-described method in FIG. 1.

Figure 2:
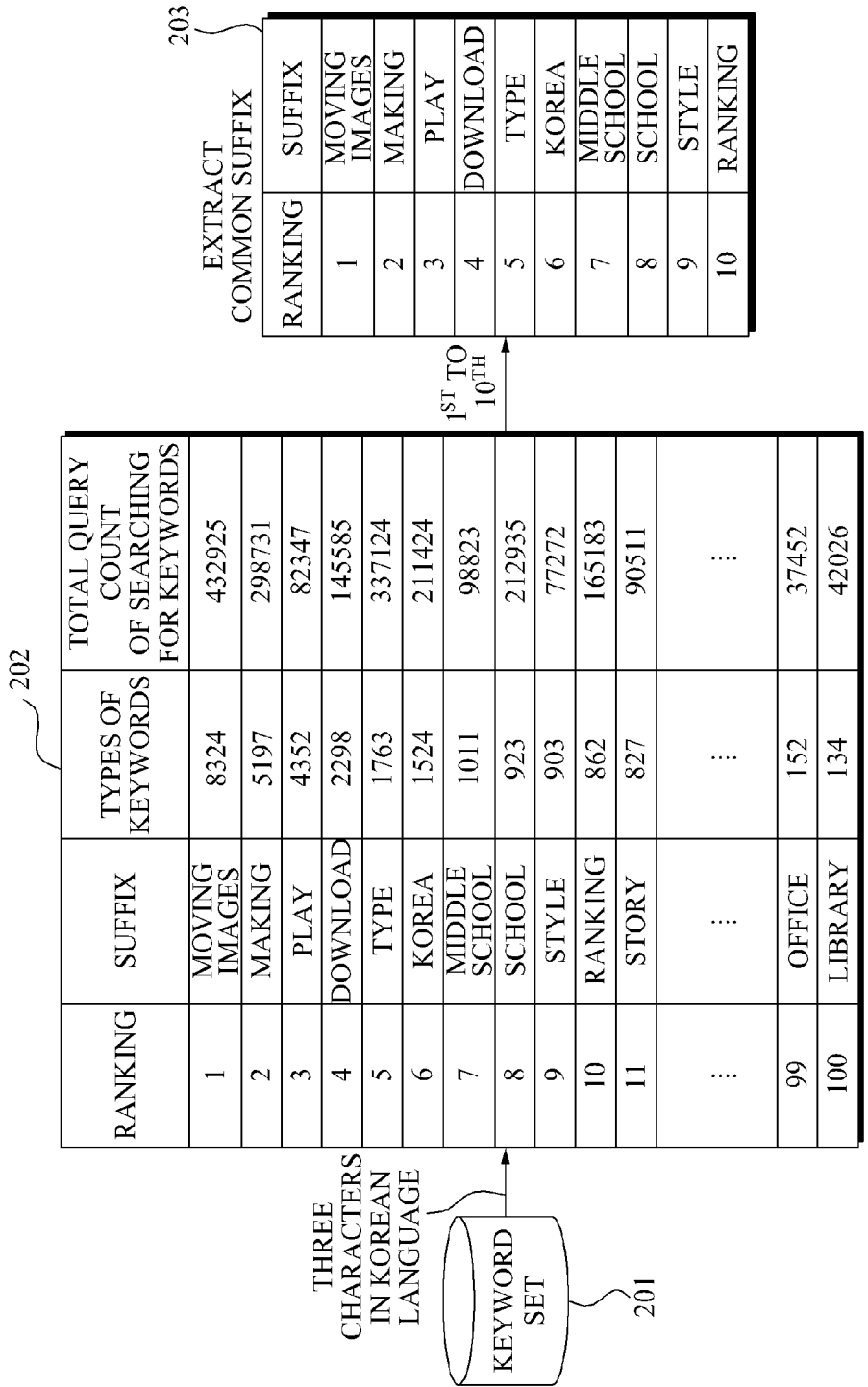
FIG. 2 is a diagram illustrating operations of extracting a common suffix using ranking of affixes with an identical number of characters in a keyword set according to an embodiment of the present invention.

FIG. 2 is a diagram illustrating operations of extracting a common suffix using ranking of affixes with an identical number of characters in a keyword set according to an embodiment of the present invention.

A keyword set 201 may indicate a medium storing keywords inputted from a plurality of persons requesting a search, and may include a search server performing the same function, a search database, a storage device, and the like.

The keyword set 201 may include keywords being inputted during a predetermined time period. This is to provide a more accurate ranking result using the keywords being inputted during the predetermined time period, and to provide popularities for the keywords during the predetermined time period, that is at a predetermined specific daily, weekly, monthly, or yearly time.

A table for suffix ranking 202 shows results that keywords including each of a plurality of affixes with a common attribute in a keyword set are counted and a ranking of each affix is counted using the counting result of the keyword.

The table for suffix ranking 202 illustrates, in case of three characters in the Korean language, keywords including suffixes with three characters.

The counting results for the keywords including suffixes consist of three characters in the Korean language in the keyword set 201 are shown in the table for suffix ranking 202, as described above, the counting result for the keywords may include the number of types of the keywords and the total query count (QC) searching for the keywords.

As an example, referring to the table for suffix ranking 202, when a suffix is "Story", a number of types of keywords may be counted such as "Photo Story", "Travel Story", "Love Story", and the like, a total query count of the keywords such as "Hong Gil Dong's Photo Story", "Mashimellow's Love Story", "Star Story", and the like which include the suffix "Story" may be counted. As shown in the table for suffix ranking 202, the number of types of the keywords is 827 and the total query count of keywords is 90511.

In FIG. 2, from among the counting results for the keywords, a ranking of each suffix with three characters is counted in an order of a number of types of the keywords being larger and is shown in the table for suffix ranking. In this instance, an order of suffixes may be determined by arranging the suffixes in an order of the total query count of searching for the keywords and by counting rankings for suffix. Also, the ranking of each suffix may be calculated by respectively applying a weight to the number of types of the keywords and the total query count of search for keywords, and weight-applied values are arranged in an order of added scores being larger.

Also, the weight based on a unique attribute of each suffix is respectively applied to the number of types of the keywords or the total query count of searching for the keywords, and added values are arranged in an order of being larger, thereby calculating a ranking of each suffix. In this instance, as described above in FIG. 1, a larger weight may be applied to a case that a suffix has meaning by itself than a case that a suffix does not have meaning by itself. In the table for suffix ranking 202, a larger weight may be applied to "Moving Images", "Making", and "Middle School" than "Play", and "Ranking". The above described method for determining a suffix ranking is one of embodiments, and other data being counted with respect to keywords may be used.

A common suffix extraction list 203 shows suffixes extracted from the table for suffix ranking 202, the suffixes, within a predetermined ranking being determined by a keyword ranking provider, is extracted to be common suffixes. In FIG. 2, it is illustrated that suffixes from $1^{st}$ to $10^{th}$ ranks are extracted to be common suffixes.

The table for suffix ranking 202 is one of embodiments, and may be determined in another type. A method for extracting a common suffix according to an embodiment of the present invention may include other methods as well as the above described method.

Figure 3:
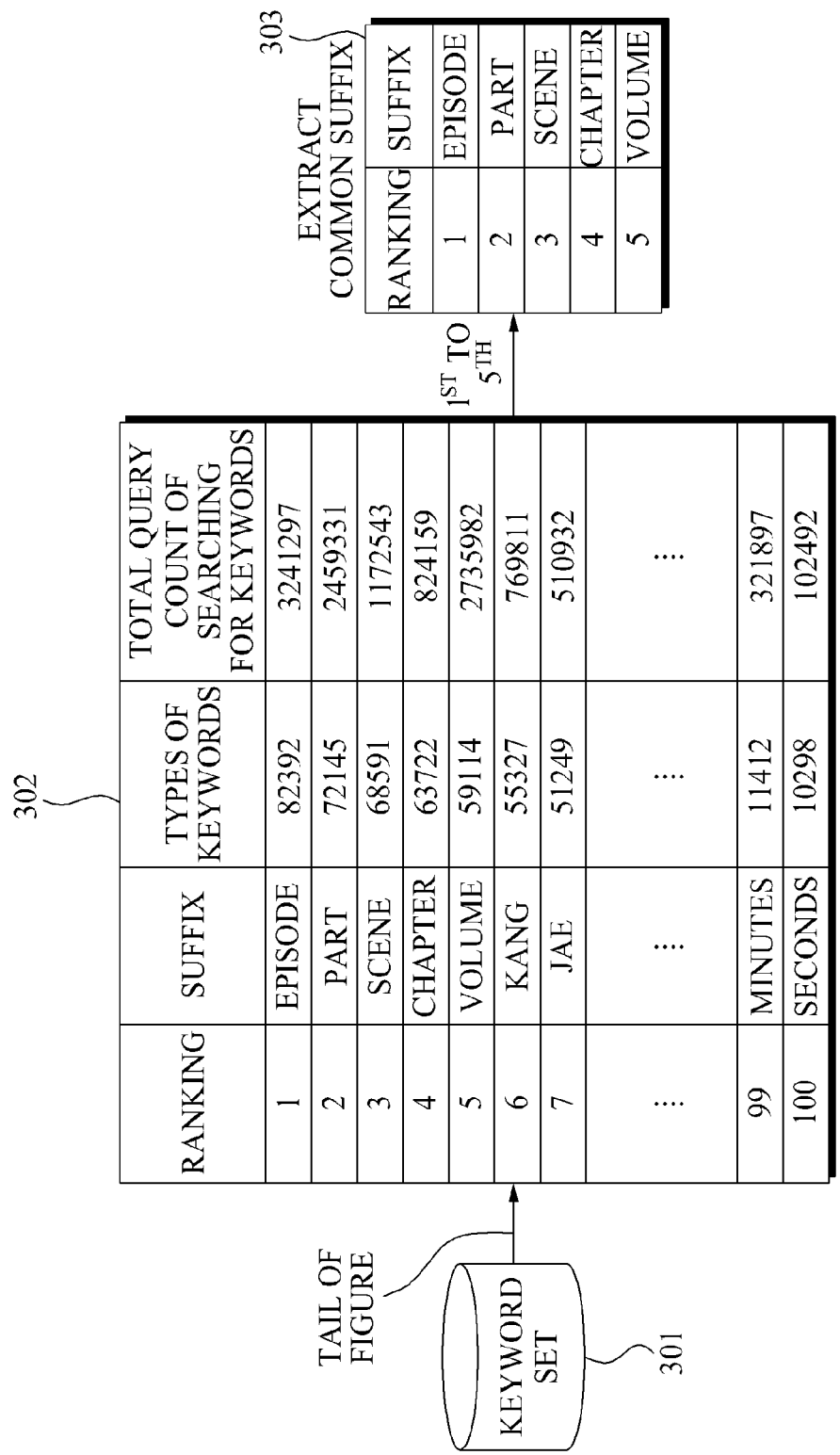
FIG. 3 is a diagram illustrating operations of extracting a common suffix using a ranking of a suffix which is combined with a tail of a figure in a keyword set according to an embodiment of the present invention.

FIG. 3 is a diagram illustrating operations of extracting a common suffix using a ranking of a suffix which is combined with a tail of a figure in a keyword set 301 according to an embodiment of the present invention.

In FIG. 3, operations of providing suffix ranking which is combined with the tail of the figure in the keyword set may be similar to operations described in FIG. 2. Distributions are shown in a table for suffix ranking 302, the distributions showing counting results of suffixes shown in the tail of the figure. In particular, a case that keywords include a title of moving images of series type correspond to the above example, however examples are not limited to moving images, and may include books, include software, and general media contents.

As shown in the table for suffix ranking 302, the suffixes combined with the tail of the figure include "Episode", "Part", and "Scene" indicating a sequence of the series. Since a method for counting keywords including the suffixes and determining keyword ranking is similar to the above-described method in FIG. 2, the corresponding contents may be referred to.

A list for common suffix extraction 303 illustrates that a suffix, within a predetermined ranking, is extracted from suffix rankings to be a common suffix, the suffixes being combined with the tail of the figure which indicate a frequency of a search target.

The method for extracting the common suffix may include other methods as well as the above described method, and is not limited to the extracting of the suffix within the predetermined ranking to be the common suffix.

Figure 4:
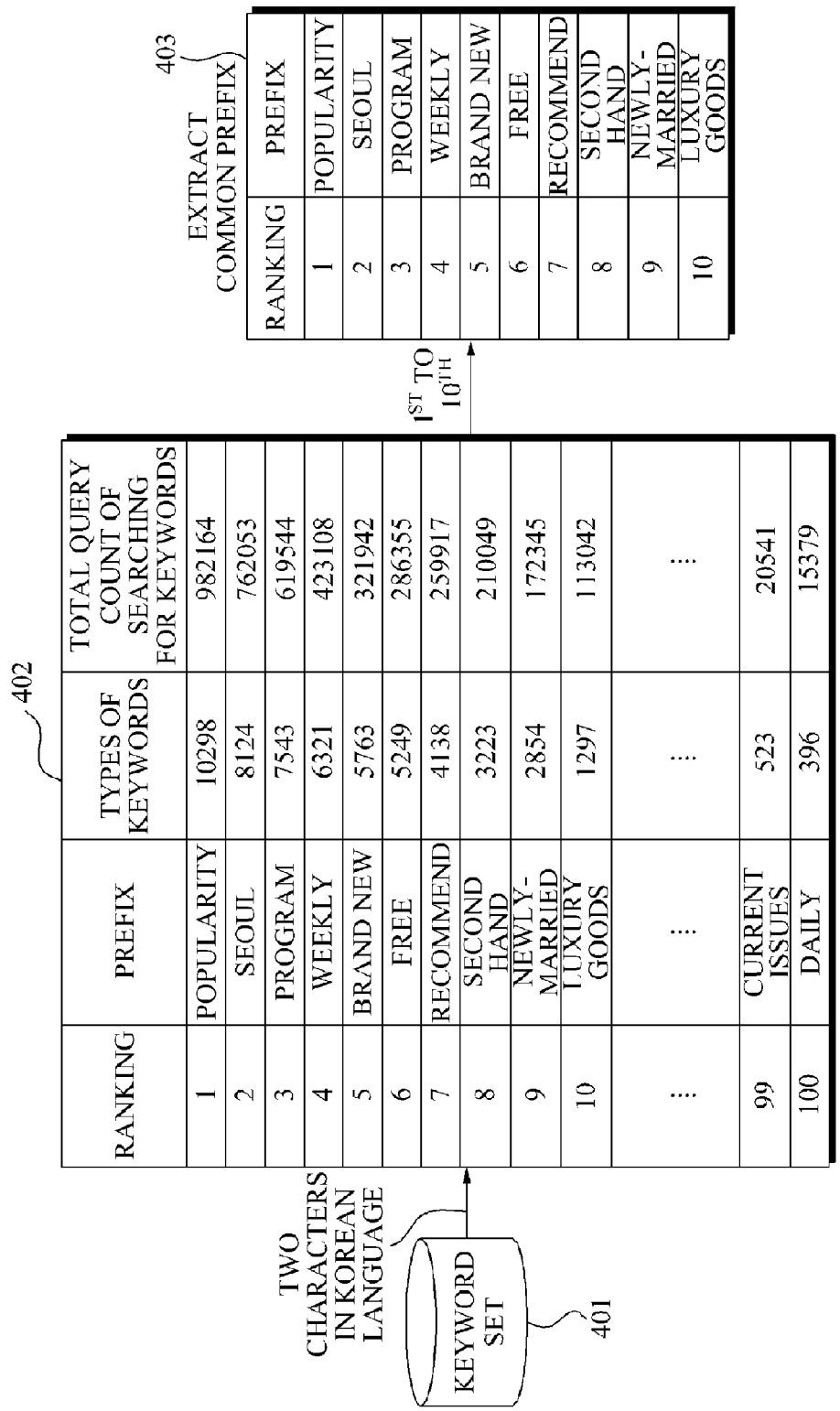
FIG. 4 is a diagram illustrating operations of extracting a common prefix from a keyword set using prefix ranking with an identical number of characters according to an embodiment of the present invention.

FIG. 4 is a diagram illustrating operations of extracting a common prefix from a keyword set 401 using prefix ranking with an identical number of characters according to an embodiment of the present invention.

The keyword set 401 may indicate a medium storing keywords inputted from a plurality of people requesting for a search, and may include a search server, a search database, a storage device, and the like.

The keyword set 401 may include keywords being inputted during a predetermined time period. This is because to provide more an accurate ranking result using the keywords being inputted during the predetermined time period, and to provide popularities for the keywords during the predetermined time period, that is at a predetermined specific daily, weekly, monthly, or yearly time.

A table for prefix ranking 402 illustrates counting keywords including prefixes with a common attribute, and calculating a ranking of each of a plurality of prefixes using the counting result of the keywords. The table for prefix ranking 402 used the counting result of keywords including prefixes with the common attribute in a keyword set 401. FIG. 4 illustrates an example using keywords including prefixes with two characters.

The counting results of the keywords including prefixes with two characters are shown in the table for prefix ranking 402. The counting results may correspond to a number of types of the keywords or a total query count of searching for the keywords.

As an example, referring to the table for prefix ranking 402, when a prefix is "Seoul", a number of types of the keywords which include the prefix "Seoul" may be counted as "Seoul Subway", "Seoul University", "Seoul Station", "Seoul Tower", and the like. Also, a total number of query counts of searching for the keywords may be counted as "Seoul Subway Lines", "Seoul University Entrance", "Seoul Station Time Table", and the like. As shown in the table for prefix ranking 402, the number of types of the keywords which include the prefix "Seoul" and of the total number of query counts of searching for the keywords is respectively 8,124 and 762,054.

The table for prefix ranking 402 show rankings for prefixes with two characters arranged in an order of the number of types of the keywords being larger as a result of counting keywords. In this instance, the prefixes are arranged in an order of the total query count of searching for the keywords, and a ranking of each prefix are calculated, thereby determining an order of prefixes. Also, the table for prefix ranking 402 may indicate a ranking of an each prefix by respectively applying a predetermined weight to each of converted scores of the number of types of the keyword and the total query count of searching for the keywords, and by arranging the weight-applied scores in an order of added scores being larger.

Also, a ranking of each prefix may be counted by applying a weight in accordance with a unique attribute of each prefix to the number of types of the keywords or the total query count of searching for the keywords or by applying the weight to each of the number of types of the keywords or the total query count of searching for the keywords, and by arranging the weight-applied values in an order of being larger.

A common prefix extraction list 403 shows prefixes extracted from the table for prefix ranking 402, the prefixes, within a predetermined ranking being determined by a keyword ranking provider, is extracted to be common suffixes. In FIG. 4, it is illustrated that prefixes from $1^{st}$ to $10^{th}$ ranks are extracted to be common prefixes.

FIG. 5 is a diagram illustrating operations of providing keyword ranking using an extracted common affix according to an embodiment of the present invention. The operations of providing keywords ranking using an extracted common suffix was described in FIG. 2, and the operations of providing keywords ranking using an extracted common prefix was described in FIG. 4.

In a common suffix extraction list 501, it is assumed that an extracted suffix is "Play", a regular expression 502 may be established as [(Episode+Part+Scene)*Re*Play]. The suffixes "Episode", "Part", "Scene" may be already known to a keyword ranking provider, and may be common suffixes which are extracted from suffixes indicating a number of being combined with a tail of figures as described in FIG. 3.

A total query count of searching for each of a plurality of keywords being determined via a regular expression is counted, and keyword rankings arranged in an order of the total query count of searching for the keywords being larger may be shown in a table for keyword ranking 503. Since "Episode", "Part", and "Scene" indicating a sequence of moving images of a series type are included in the regular expression, re-play of moving images within higher 30 ranks are mostly illustrated.

In this instance, another type of keyword ranking may be provided, specifically, when figures and suffixes are combined as shown in the regular expression 502, keyword ranking may be provided according to a total query count of searching for a keyword including a word being combined with a head of the figures. The words being combined with the head of the figures are generally moving images of a series type, and are to provide a ranking requiring re-playing with respect to an identical moving image.

As an example, when a moving image is "Prison Break", keyword rankings may be differently shown according to a total query count for searching for each of keywords including "Prison Break" and ranked as $2^{nd}$, $3^{rd}$, and $11^{th}$ in the table for keyword ranking 503. Rankings for re-playing "Prison Break" may be in an order of Episode 10, 9, and 5 when results shown in the table for keyword ranking 503. In this instance, "Scene" and "Episode" are differently expressed by each search requester, and may be identically expressed.

Figure 6:
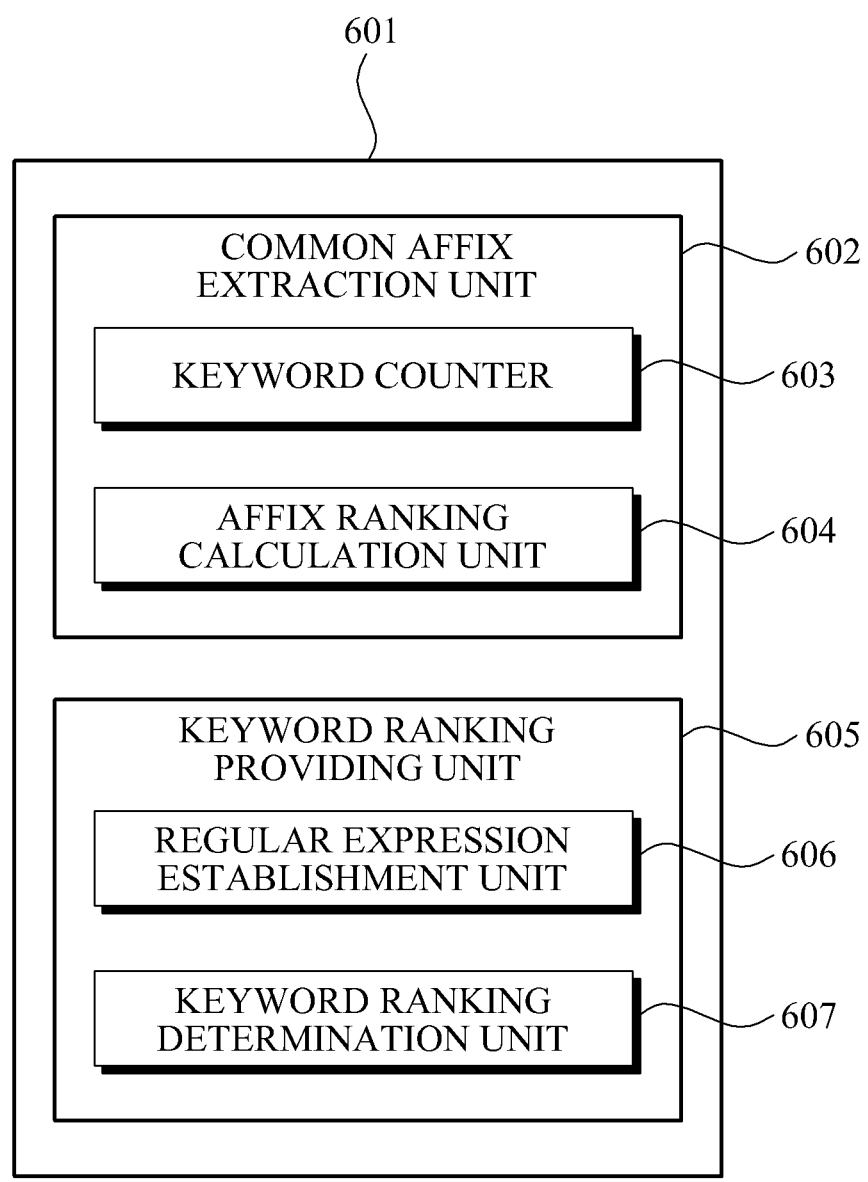
FIG. 6 is a diagram illustrating a configuration of a system for providing keyword ranking using an extracted keyword ranking according to an embodiment of the present invention.

FIG. 6 is a diagram illustrating a configuration of a system 601 for providing keyword ranking using an extracted keyword ranking according to an embodiment of the present invention. With respect to a method for providing a keyword ranking using a common affix, it may correspond to the descriptions in FIGS. 1 through 4.

The system 601 for providing keyword ranking may include a common affix extraction unit 602 and a keyword ranking providing unit 605. The common affix extraction unit 602 may include a keyword counter 603 and an affix ranking calculation unit 604, and the keyword ranking providing unit 605 may include a regular expression establishment unit 606 and a keyword ranking determination unit 607.

The common affix extraction unit 602 may extract a common affix using a keyword set. Namely, the common affix may be extracted by calculating a ranking of an affix satisfying a specific condition from among keywords stored in the keyword set.

The keyword counter 603 may count keywords including each of a plurality of affixes with a common attribute in the keyword set. Specifically, a number of types of the keywords including each of the plurality of affixes with the common attribute or a total query count of searching for the keywords may be counted. Also, both the number of types of the keywords including each of the plurality of affixes with the common attribute and the total query count of searching for the keywords may be counted. As an example, the common attribute may indicate that affixes with identical characters.

The affix ranking calculation unit 604 may calculate a ranking of each affix of the plurality of keywords using a counting result in the keyword counter 603. That is, a ranking of each affix may be calculated using the number of types of the keywords and the total count of searching for the keywords.

In this instance, the method for counting the ranking may be divided into two depending on whether to consider a number of types of keywords or whether to consider a total query count of searching for the keywords.

First, a ranking of each affix is calculated by arranging a number of types of keywords in an order of being larger or by arranging a total query count of searching for the keywords in an order of being larger. Otherwise, a ranking of each affix is calculated by applying a weight according to an affix attribute to each of the number of types of keywords in an order of being larger and by arranging the total query count of searching for the keywords in an order of being larger.

Second, a ranking of each affix may be calculated by applying a weight to each of a first score and a second score, the first score being generated by converting the number of types of the keyword and the second score being generated by converting the total query count of searching for the keywords. In this instance, the ranking of each affix may be calculated by arranging added values of results of multiplication of the weight according to the affix attribute by each of the number of types of keywords and the total query count of searching for the keywords.

In this instance, the weight to be multiplied by the converted scores may be a value weighted by a keyword ranking provider according to a weight by scaling scores distributions in different ranges. The weight according to the affix attribute may be increased in a case that an affix has meaning by itself or the affix is used as a keyword itself.

The common affix extraction unit 602 may extract an affix, within a predetermined ranking for common affix extraction, to be the common affix, the predetermined ranking for common affix extraction being calculated in the affix ranking counting unit 604 from among a plurality of affixes. The predetermined ranking for common affix extraction may be determined according to a configuration of the system.

The regular expression establishment unit 606 may establish a regular expression using the extracted common affix. In this instance, the regular expression may indicate a search query which consists of the extracted common affix or a combination of the extracted affix and words.

The keyword ranking determination unit 607 counts a total query count of searching for each of the plurality of keywords being determined via the regular expression, and may determine a ranking of a corresponding keyword by arranging the keywords in an order of a total query count of searching for the keywords.

The method for providing keyword ranking using a common affix according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for providing keyword ranking using a common affix, the method comprising:
    providing a keyword set that comprises keywords input to an Internet search environment as search queries;
    counting, in the keyword set, keywords that comprise affixes with a common attribute;
    calculating a ranking of each affix using the counting result of the keywords and extracting a common affix, the calculating including applying a weight to the counting result of the keywords based on an attribute of each affix, the weight according to the attribute of each affix increases as query counts of each affix being a keyword itself increases; and
    establishing a regular expression comprising the extracted common affix and a search combination symbol.

2. The method of claim 1, wherein the counting of the keywords is based on counting the number of types of the keywords that comprise affixes with a common attribute or a total query count of searching for the keywords.

3. The method of claim 1, wherein the common attribute comprises a number of characters in the affixes, and the number of characters in the affixes is variable every time the keyword ranking is provided.

4. The method of claim 2, wherein the ranking of each affix is calculated using the number of types of the keywords or the total query count of searching for the keywords.

5. The method of claim 2, wherein the ranking of each affix is calculated by applying a weight to a first score and a weight to a second score, the first score being generated by converting the number of types of the keyword and the second score being generated by converting the total query count of searching for the keywords.

6. The method of claim 1, wherein the common affix is an affix that meets common affix extraction rank parameters.

7. The method of claim 2, further comprising:
    providing keyword ranking of keywords which include the extracted common affix.

8. The method of claim 1, wherein the providing of the keyword ranking comprises:
    determining the keyword ranking using the total query count of searching for a plurality of keywords which are determined via the regular expression.

9. The method of claim 8, wherein the establishing the regular expression establishes a search query which consists of the extracted common affix or a combination of the extracted affix and words.

10. The method of claim 1, wherein the regular expression further comprises keywords other than the extracted common affix.

11. A non-transitory computer-readable storage medium with an executable program stored thereon, wherein, when executed, the program instructs a microprocessor to perform a method comprising:
    providing a keyword set that comprises keywords input to an Internet search environment as search queries;
    counting, in the keyword set, keywords that comprise affixes with a common attribute;
    calculating a ranking of each affix using the counting result of the keywords and extracting a common affix, the calculating including applying a weight to the counting result of the keywords based on an attribute of each affix, the weight according to the attribute of each affix increases as query counts of each affix being a keyword itself increases; and
    establishing a regular expression comprising the extracted common affix and a search combination symbol.

12. A system for providing keyword ranking, the system comprising:
    a storage device configured to store a keyword set that comprises keywords input to search an Internet search environment as search queries; and
    a processor comprising:
        a common affix extraction unit configured to extract a common affix using a keyword set, the common affix extraction unit including,
            a keyword counter configured to count keywords including each of a plurality of affixes with a common attribute in a keyword set, and
            an affix ranking calculation unit configured to calculate a ranking of each affix using the counting result of the keywords and to extract the common affix and by applying a weight to the counting result of the keywords based on an attribute of each affix, the weight according to the attribute of each affix increases as query counts of each affix being a keyword itself increase;
        a keyword ranking providing unit configured to provide ranking of keywords which include the extracted common affix; and
        a regular expression establishment unit configured to establish a regular expression using the extracted common affix and a search combination symbol.

13. The system of claim 12, wherein the keyword counter is configured to count a number of types of the keywords including each affix or a total query count of searching for the keywords.

14. The system of claim 12, wherein the common attribute comprises a number of characters in the affixes, and the number of characters in the affixes is variable every time the keyword ranking is provided.

15. The system of claim 12, wherein the affix ranking calculation unit is configured to calculate a ranking of each affix using the number of types of the keywords or the total query count of searching for the keywords.

16. The system of claim 13, wherein the affix ranking calculation unit is configured to calculate the ranking of each affix by applying a weight to a first score and a second score, the first score being generated by converting the number of types of the keyword and the second score being generated by converting the total query count of searching for the keywords.

17. The system of claim 12, wherein the common affix extraction unit is configured to extract an affix which meets common affix extraction rank parameters among a plurality of affixes.

18. The system of claim 12, wherein the keyword ranking providing unit comprises:

a keyword ranking determination unit configured to determine the keyword ranking using the total query count of searching for a plurality of keywords which are determined via the regular expression.

19. The system of claim 18, wherein the regular expression establishment unit is configured to establish a search query which consists of the extracted common affix or a combination of the extracted affix and words.

20. The system of claim 12, wherein the regular expression further comprises keywords other than the extracted common affix.

\* \* \* \* \*